United States Patent [19]

Saudax

[11] 4,254,396
[45] Mar. 3, 1981

[54] ALARM CIRCUIT FOR CAR ALTERNATOR

[75] Inventor: Pierre Saudax, Brissac Quince, France

[73] Assignee: Motorola, Inc., Schaumburg, Ill.

[21] Appl. No.: 38,965

[22] Filed: May 14, 1979

[30] Foreign Application Priority Data

May 23, 1978 [FR] France .................................. 78 15309

[51] Int. Cl.³ ............................................. G08B 21/00
[52] U.S. Cl. .................................. 340/52 R; 340/510;
340/635; 340/662; 340/663; 320/48
[58] Field of Search ...................... 340/52 R, 510, 540,
340/635, 636, 645, 646, 648, 650, 651, 653, 657;
320/48, 68

[56] References Cited

U.S. PATENT DOCUMENTS

| 3,138,751 | 6/1964 | Brewster | 320/68 |
| 3,210,727 | 10/1965 | McLaughlin et al. | 340/52 R |
| 3,305,774 | 2/1967 | Heath | 340/635 |
| 3,321,754 | 5/1967 | Grimm et al. | 340/52 R |
| 3,524,121 | 8/1970 | Nolan et al. | 320/48 |
| 3,624,482 | 11/1971 | Ruff | 340/636 |
| 3,944,905 | 3/1976 | Allport et al. | 320/48 |

FOREIGN PATENT DOCUMENTS 1209103 10/1970 United Kingdom .
1493707 11/1977 United Kingdom .
1499175 1/1978 United Kingdom .

Primary Examiner—Alvin H. Waring
Attorney, Agent, or Firm—Phillip H. Melamed; James W. Gillman

[57] ABSTRACT

An alarm circuit indicating a defect in a car alternator, said circuit comprising a voltage divider formed by two resistors connected between the positive terminal B+ and a negative terminal D— of the alternator, the center point of the voltage divider being connected to the control electrode of a commutation circuit of which the output path is serially connected with a lamp between the terminals of the battery, and rectifier means being provided for preventing the battery to discharge through the voltage divider.

8 Claims, 2 Drawing Figures

ALARM CIRCUIT FOR CAR ALTERNATOR

The invention relates to an alarm circuit for an alternator for charging a car battery.

The object of the invention is to provide an alarm circuit for indicating a defect such as non-rotation or de-energization in a car battery charging alternator, this alternator comprising at least two terminals, one positive, one negative, connected to the armature by one or more rectifier diodes.

According to the invention, the alarm circuit comprises a voltage divider formed by two resistors in series connected between a positive terminal and a negative terminal of the alternator, the center point of this divider being connected to the control terminal of an electronic commutation circuit provided in series with a warning device between the terminals of the battery, and rectifier means being provided in the supply circuit of the battery for avoiding said latter to discharge through the voltage divider.

The electronic commutation circuit is for example a transistor circuit of which the output path is closed when the voltage applied to the control electrode reaches a predetermined value, either when increasing or decreasing. In particular, a Darlington circuit may be used having a base electrode connected to the centre point of the voltage divider and a collector-emitter output path serially connected with the warning device.

The invention will be more readily understood on reading the following description with reference to the accompanying drawings, in which.

Figure 1:
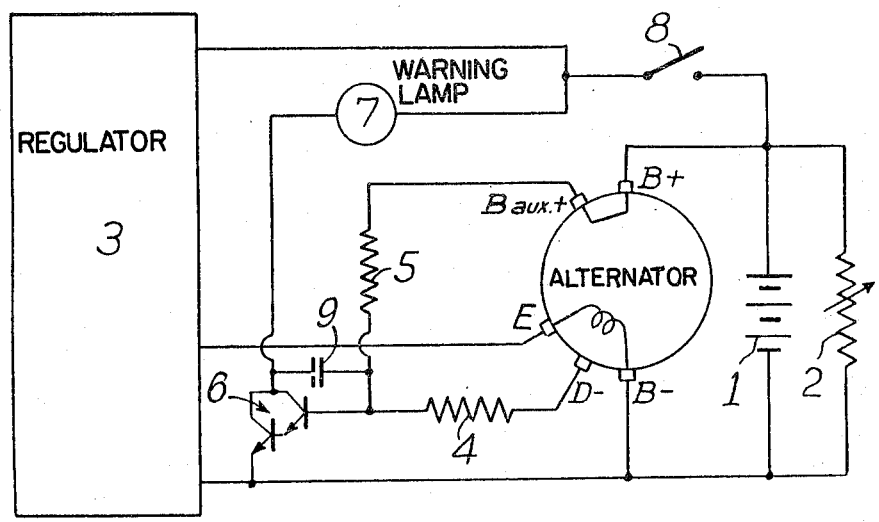
FIG. 1 is a diagram of the alarm circuit according to the invention.
Figure 2:
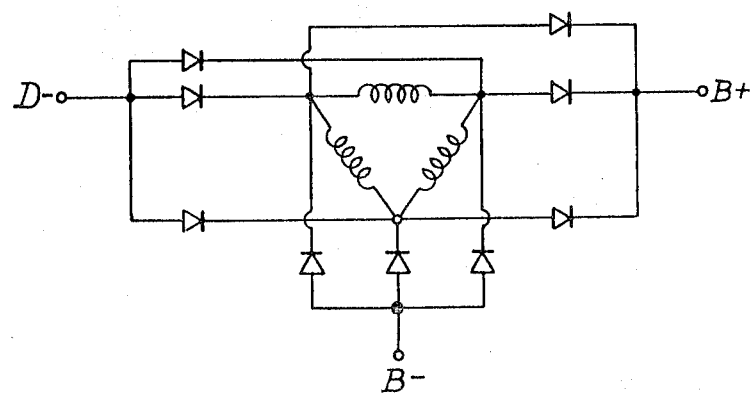
FIG. 2 shows the connection of the armature of the alternator to the different output terminals.

Referring now to the drawings, the alternator is three-phase and its armature is connected to the terminals B+ and B− of the battery supply circuit via three rectifier diodes, one on each phase; a third negative terminal D− is also connected to the armature by three diodes.

The alternator therefore comprises two terminals B+ and B− for supplying the battery 1 which feeds the variable load 2; it also comprises an excitation terminal E which is supplied by a known regulator 3 connected to the terminals B+ and B−.

Apart from these terminals, there are also terminal D− and an auxiliary terminal Baux.+ which is connected directy to the terminal B+.

The alarm circuit according to the invention comprises a voltage divider formed by two resistors 4 and 5 in series connected between the terminals Baux.+ and D−, the centre point of this divider, i.e. the point of junction of the resistors 4 and 5 is connected to the base of a Darlington circuit 6 of which the emitter is connected to the negative terminal of the battery and the collector to the positive terminal of the battery via a warning lamp 7 and a switch 8.

The functioning of the circuit when the switch is on makes it possible to indicate, by the lamp glowing, the stopping of the alternator, the de-energization thereof and the disconnection of one of terminals E, B+ or B−.

If the alternator is stopped or not energized, but rotating, no voltage appears between the terminals B+ and D− and no current circulates in the divider since the diodes of the terminal B− isolate the battery from terminal D−, the base of the Darlington circuit is at the positive potential of the battery via the resistor 5 and the Darlingtion circuit 6 being saturated, the battery feeds the lamp 7 collector-emitter circuit of the Darlington circuit 6 and the warning lamp glows.

If the positive terminal B+ is disconnected, the output voltage between B+ aux. and D− is a function of the speed of the alternator and always greater than the regulation voltage, it follows that the base is at a high voltage which saturates the Darlington circuit 6, whereby the warning lamp glows.

In normal running with the alternator rotating, the terminal D− is at the same potential as terminal B−, the resistors 4 and 5 function as voltage divider and their value is such that the potential applied to the base of Darlington circuit 6 is lower than the limit of conductions of the transistor and no current circulates in the lamp 7 which is extinguished.

As above indicated, the terminal D− is separated by diodes from the terminal B− of the battery supply circuit. The battery does not discharge through the voltage divider 4, 5 which is exclusively supplied with current delivered by the alternator.

If the terminal D− does not exist, the resistor 4 may be connected to the terminal B−, on condition that an separating diode be inserted between the terminal B− and the negative terminal of the battery, avoiding the battery feeding the voltage divider.

A sharp commutation of the load 2 results in an overvoltage which saturates, for a certain period of time, the battery 1, which provokes the blocking of the regulator 3 and consequently the de-energization of the alternator which lights up the warning lamp.

This phenomenon is avoided by connecting means to the base of the Darlington circuit 6 for eliminating the transient voltage variations, for example a capacitor 9 connected between the base and the collector of the Darlington circuit. The presence of the capacitor 9 will not disturb the normal running of the Darlington circuit since the latter has a high gain and a high input impedance.

I claim:

1. An alarm circuit for indicating a defect in a diode-rectified alternator for charging a car battery having positive and negative terminals connected for charging, respectively, to first and second alternator output terminals of said alternator at which rectified positive and negative voltages are provided, the voltage between said first and second alternator output terminals being maintained at a normal running output voltage for charging the battery during normal alternator operation, said alarm circuit comprising:

an electrical commutation circuit having an output path and a control terminal for providing current flow through said output path in response to when a control voltage at the control terminal exceeds a predetermined threshold voltage with respect to said second alternator output terminal, a warning device connected with and controlled by said output path between said battery terminals, and a voltage divider for providing said control voltage, said divider having a central point connected to said control terminal and two end terminals connected, respectively, to first and second auxiliary terminals of said alternator, said first and second auxiliary terminals providing potentials substantially equal to the potentials at said first and second alternator output terminals, respectively, during the normal running operation of said alternator, wherein said first auxiliary alternator terminal and said first alternator output terminal are directly connected together to be maintained at substantially the same potential, while diode means are coupled between said second auxiliary terminal and said second alternator output terminal to isolate said second auxiliary terminal and said voltage divider from said second alternator output terminal and one of said positive and negative battery terminals, wherein said diode means prevents said battery from supplying current flow through said voltage divider and wherein said control voltage exceeds said threshold voltage for both low and high voltage outputs between said first and second alternator output terminals thereby causing excitation of said warning device, and said control voltage is less than said threshold voltage for the normal running voltage output, between said low and high voltage outputs, being provided between said first and second alternator output terminals.

2. An alarm circuit according to claim 1 wherein said warning means is connected in series with the output path of said electrical commutation circuit for connection between said battery terminals.

3. An alarm circuit according to claim 1 wherein said voltage divider comprises a resistor voltage divider.

4. An alarm circuit according to claim 8 wherein said diode means comprises a first plurality of rectifying diodes which provide the rectified voltage output at said second alternator output terminal.

5. An alarm circuit according to claim 3 wherein said diode means also includes a second plurality of diodes which provide a rectified voltage output at said second auxiliary alternator terminal which is isolated from but substantially identical to the rectified voltage output provided at said second alternator output terminal.

6. An alarm circuit as claimed in claim 1, wherein means are connected to said control electrode for eliminating transient voltage variations.

7. An alarm circuit as claimed in claim 1, wherein said commutation means comprise a Darlington circuit having a base electrode connected to the center point of the voltage divider and a collector-emitter output path serially connected with said warning device.

8. An alarm circuit as claimed in claim 7, wherein a capacitor is connected between the base and the collector of the Darlington circuit.

* * * * *